(12) United States Patent
Jenkins, IV et al.

(10) Patent No.: US 6,393,591 B1
(45) Date of Patent: May 21, 2002

(54) METHOD FOR REMOTELY TESTING MICROELECTRONIC DEVICE OVER THE INTERNET

(75) Inventors: Jesse H. Jenkins, IV, Danville; Walter H. Edmondson, Morgan Hill, both of CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 09/249,907

(22) Filed: Feb. 12, 1999

(51) Int. Cl.⁷ ................................................ G01R 31/28

(52) U.S. Cl. ...................... 714/725; 714/726; 714/727

(58) Field of Search ................................ 714/724, 727, 714/726, 736, 725; 702/119, 117; 707/9; 364/578

(56) References Cited

U.S. PATENT DOCUMENTS

| | | | |
|---|---|---|---|
| 4,964,124 A | * 10/1990 | Burnett | 714/724 |
| 5,625,580 A | * 4/1997 | Read et al. | 364/578 |
| 5,630,048 A | 5/1997 | La Joie et al. | |
| 5,809,036 A | * 9/1998 | Champlin | 714/726 |
| 5,845,234 A | * 12/1998 | Testa et al. | 702/119 |
| 5,920,490 A | * 7/1999 | Peters | 364/578 |
| 5,978,945 A | * 11/1999 | Muris | 714/727 |
| 6,134,690 A | * 10/2000 | Ivaturi et al. | 714/736 |
| 6,151,599 A | * 11/2000 | Shrader et al. | 707/9 |
| 6,182,020 B1 | * 1/2001 | Fairbanks | 702/117 |

FOREIGN PATENT DOCUMENTS

WO    WO 98/36356    8/1998

OTHER PUBLICATIONS

Reference Book "IEEE Standard Test Access Port and Boundary–Scan Architecture", IEEE Std 1149.1, Oct. 21, 1993, Published by the Institute of Electrical and Engineers, Inc. 345 East 47th Street, NY, NY 10017.
Supplement to "IEEE Standard Test Access Port and Boundary–Scan Architecture", IEEE Std 1149.1, Oct. 21, 1993, Published by the Institute of Electrical and Electronics Engineers, Inc. 345 East 47th Street, NY, NY 10017, Mar. 1, 1995.
Stan Runyon, "Silicon Debug, Scan Tools Go Online", EE Times, Dec. 14, 1998, Issue: 1039, Section: Design Automation, 4 pages.

* cited by examiner

*Primary Examiner*—David Ton
(74) *Attorney, Agent, or Firm*—Edel M. Young; W. Eric Webostad

(57) ABSTRACT

The Internet is used to test an integrated circuit chip that is provided with boundary scan circuitry and plugged into a circuit board at a customer's location. A host computer at the manufacturer's location runs a web page server having the ability to remotely test a customer's chip. The process is initiated by the customer connecting the circuit board to his own computer and logging onto the web site. The customer transmits customer identification and other data to the web server, which then transmits a downloader program and a JAVA program script to the customer's computer. The customer's computer then uses the downloader program to transmit high and low level device data describing the functionality of the chip to the host computer, which then generates and transmits a set of suitable test vectors to the customer's computer. Then, the customer's computer tests the chip using the boundary scan circuitry and test vectors and transmits the test results to the host computer, which then produces and transmits an evaluation of the results to the customer's computer.

20 Claims, 4 Drawing Sheets

US 6,393,591 B1

METHOD FOR REMOTELY TESTING MICROELECTRONIC DEVICE OVER THE INTERNET

FIELD OF THE INVENTION

The present invention generally relates to the art of microelectronic integrated circuits, and more specifically to a method for remotely testing an integrated circuit chip or other microelectronic device over the Internet.

BACKGROUND OF THE INVENTION

Very large integrated circuit chips such as Programmable Logic Devices (PLD) and Application Specific Integrated Circuits (ASIC) are extremely intricate devices that are fabricated using a large number of precise and critical processing steps. Unfortunately, technology has not advanced to the point at which such a device can be fabricated with perfect reliability and be expected to never fail.

There are many ways in which a device can partially or completely malfunction, and it can be difficult to diagnose the source of a particular failure mode. The problem is exacerbated by the fact that integrated circuits are not used by themselves, but are components that are plugged into sockets on circuit boards that also include a number of other interconnected components. A particular malfunction can be the result of not only an internal fault in a chip, but from other components on the board and/or the manner and functionality in which the components are interconnected.

Programmable integrated circuit devices such as PLDs are fabricated and subjected to extensive testing at a manufacturing facility, and then shipped to customers who program the devices to implement their own required functionality. The programmed devices are assembled onto boards as described above and connected to power supplies and additional components to produce finished electronic products. The boards often include nonvolatile memories that program the PLDs ever time power is turned on. These products are then tested and shipped to consumers.

A PLD or other device can fail immediately or after a period of use. The testing procedure for a finished product occurs both at the time of its initial manufacture and when it is returned to the manufacturer for repair.

In order to facilitate testing of large integrated circuits such as PLDs, a methodology has been formulated by the Joint Test Action Group (JTAG) and codified as IEEE specification no. 1149.1. The methodology includes adding special microelectronic components known as "boundary scan circuitry" to the integrated circuit chips. This circuitry enables test signals known as "vectors" to be applied to the input pins of the chip and resulting output signals to be read at the output pins. Although the testing can be performed without removing a chip from its socket, the testing is isolated to the internal functionality of the chip and is unaffected by the other components on the board.

Depending on the manner in which the individual elements of the chip are fabricated or programmed to perform a particular function, a set of test vectors is generated such that every testable logic element in the chip will be subjected to a test that determines if the individual element is functioning properly. For every input vector there will be a resulting output signal that will have a particular value if there is no malfunction. If the actual output signals match the expected values, the testing will indicate that there are no damaged or malfunctioning elements in the chip.

Although boundary scan circuitry is provided in a large number of integrated circuit chips being currently fabricated, many customers do not have the ability to perform the tests and/or generate a suitable set of test vectors. If there is a malfunction, they return the chip to the manufacturer with an indication that it did not function properly. Often a customer will ask the manufacturer to test the chip and/or troubleshoot the problem.

Manufacturers generally have a procedure known as "return material authorization (RMA)" by which the customer calls the manufacturer to obtain an RMA number and returns the chip by mail with the RMA number marked on the outside of the package. Preferably, the customer will inform the manufacturer either at the time of the call or by means of a letter in the package as to the nature of the problem.

When the manufacturer receives the allegedly defective chip, the chip will be sent to a failure analysis (FA) group which performs a series of tests on the chip to determine if it is in fact defective. If the customer provided device data in the form of device specific program code indicating the functionality that was programmed into the chip, the FA group can generate a set of test vectors specific to the chip and perform boundary scan testing. The FA group can make internal tests as well. This testing can also be performed using a generic set of test vectors.

Other tests include physical examination of the chip, typically using a microscope, to locate damaged pins, etc. The protective cap can also be removed and the semiconductor die itself can be examined under a microscope.

Assuming that the chip itself is defective, the FA group will hopefully isolate the cause of the defect and thereby produce a solution to the problem. However, it is often the case that the chip is not defective, but is programmed improperly and/or integrated with the other components on the circuit board to cause logical, signal or timing errors. A solution to a problem of this type cannot be found by testing the chip itself.

The RMA/FA procedure as presently being practiced is subject to several serious drawbacks. First, the chip must be physically removed from the apparatus in which it is incorporated and shipped to the manufacturer. This takes an undesirably long time during which the apparatus is unavailable and inaccessible for further troubleshooting. In addition, removal of the chip can result in damage to the pins.

The FA procedure is also lengthy and labor intensive. This means that the customer must wait an extended period of time for a solution to his problem, which is especially undesirable either if the apparatus is in the process of development or if the board is left inoperable.

Further, the FA analysis may not produce an answer to the problem if the error was in another component that was connected to the chip. For these reasons, a need exists in the art for a method of quickly testing a customer's integrated circuit chip in his own facility and in the environment in which it is functionally connected.

SUMMARY OF THE INVENTION

The present invention overcomes the drawbacks of the prior art and provides a method that enables an integrated circuit chip to be quickly tested remotely and in situ.

More specifically, the present invention uses the Internet or other electronic communication media to test an integrated circuit chip that is provided with boundary scan or other suitable circuitry and plugged into a circuit board at a customer's facility.

A host computer at the manufacturer's facility runs a web page server including the ability to remotely test a customer's chip. The process is initiated by the customer connecting the circuit board to his own computer and logging onto the web site. The customer transmits identification and other data to the web server, which then transmits a downloader program and a JAVA program script to the customer's computer. Alternatively, the downloader program can be previously supplied to the customer and used to log onto the web site.

The customer's computer then uses the downloader program to transmit high and low level device data describing the functionality of the chip to the host computer, which then generates and transmits a set of suitable test vectors to the customer's computer. Then, the customer's computer tests the chip using the boundary scan circuitry and test vectors and transmits the test results to the host computer, which then produces and transmits an evaluation of the results to the customer's computer.

These and other features and advantages of the present invention will be apparent to those skilled in the art from the following detailed description, taken together with the accompanying drawings, in which like reference numerals refer to like parts.

DETAILED DESCRIPTION OF THE DRAWINGS

Figure 1:
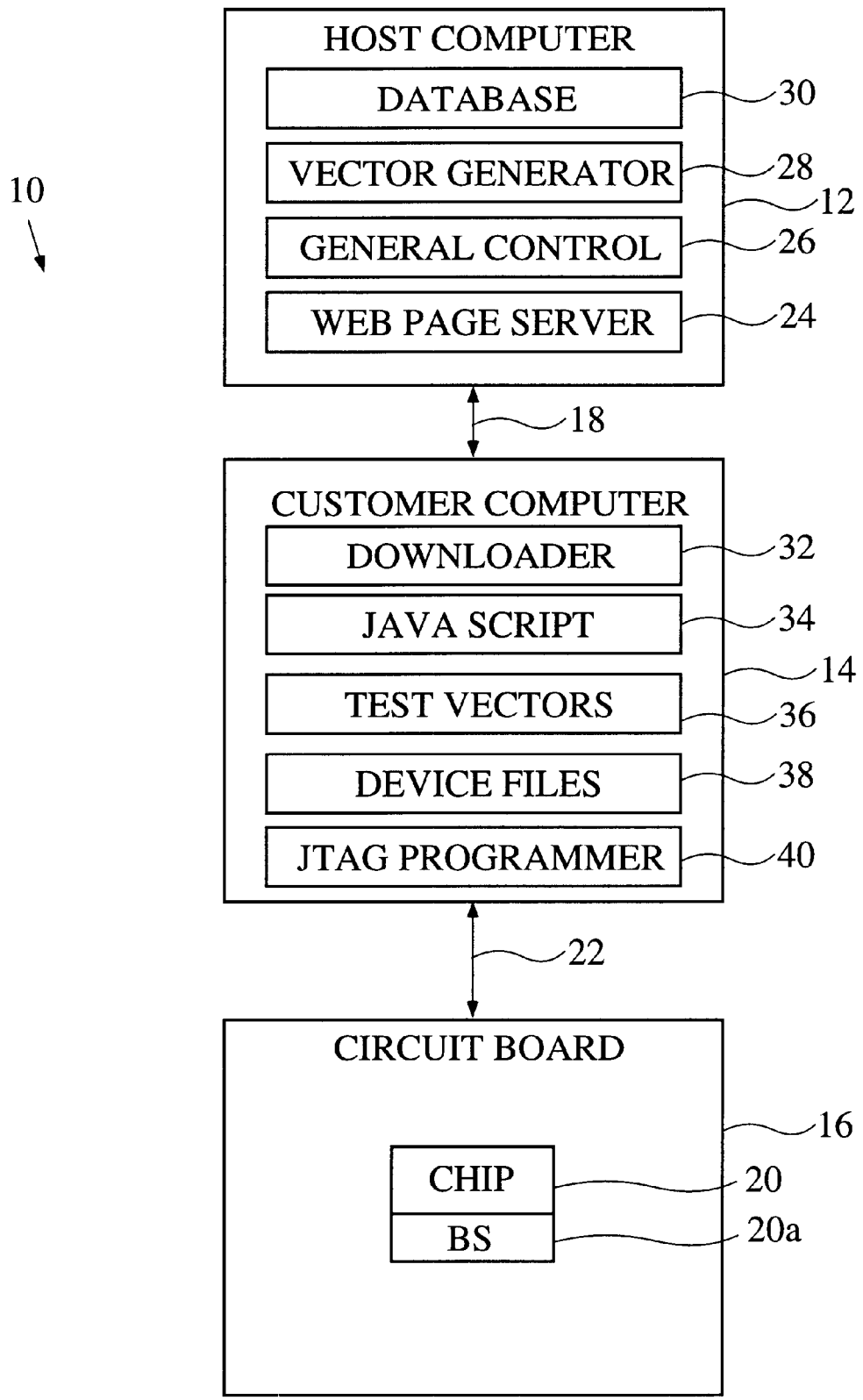
FIG. 1 is a block diagram illustrating the components used in practicing a method according to the present invention for remotely testing an integrated circuit chip or other device using the Internet.

Referring to FIG. 1 of the drawing, a system 10 for remotely testing an integrated circuit chip or other microelectronic device generally includes a host computer 12, a customer's computer 14 and a circuit board 16. The host computer 12 is provided at a manufacturer's location, whereas the customer's computer is provided at a customer's location that is remote from the manufacturer's location. Computers 12 and 14 ate typically personal or workstation general purpose computers and are interconnected by the Internet or other electronic communication such as a Wide Area Network (WAN) or Local Area Network (LAN) as symbolically indicated at 18.

A Programmable Logic Device (PLD) or other integrated circuit chip 20 that is to be tested remotely is plugged into a socket (not shown) or otherwise operatively connected to circuit board 16, which includes other components (not shown) that functionally interact with chip 20. Circuit board 16 is connected to the customer's computer 14 using a cable of the type that is conventionally used for Joint Test Action Group (JTAG) boundary scan testing and is symbolically indicated at 22. Chip 20 is provided with JTAG boundary scan circuitry 20a which is conventionally implemented in accordance with IEEE specification 1149.1.

Computers 12 and 14 include elements such as a microprocessor, memory, etc. that are conventional and will not be described in detail. Host computer 12 is programmed with a number of software program and data code modules including an Internet World Wide Web (WWW) server 24, a general control program 26, a vector generator 28 and a device and vector database 30.

The customer's computer 14 is programmed with a downloader program 32, a JAVA script 34,. test vectors 36, design files 38 and a JTAG programmer 40.

Although the preferred embodiment of the invention that will be described below utilizes JAVA script to perform the required control functions, the invention is not so limited. For example, ActiveX controls or any other suitable programming language can be employed to implement this functionality.

Figure 2:
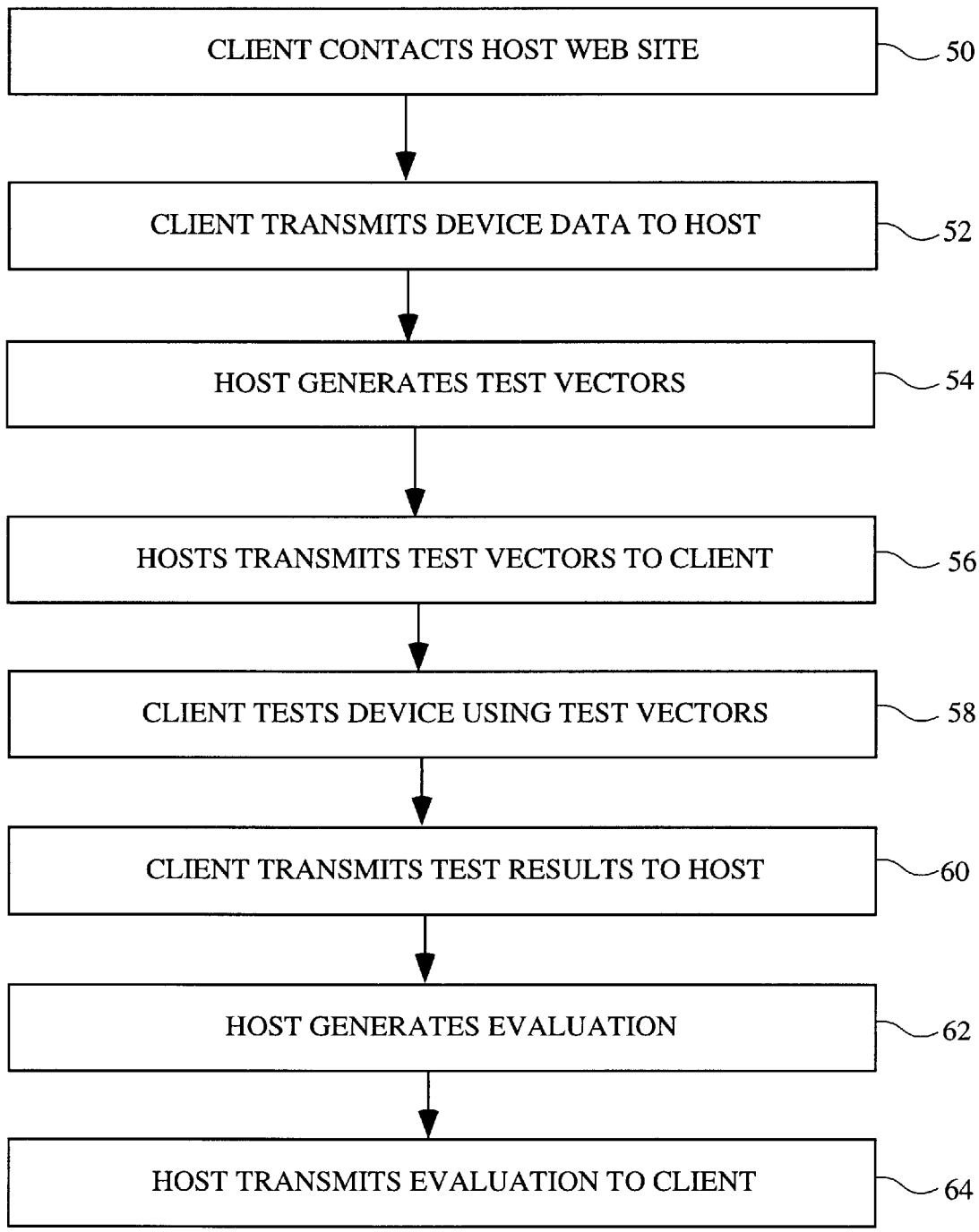
FIG. 2 is a flowchart illustrating the present method.

An overall flowchart of the present method is illustrated in FIG. 2. As indicated by a step 50, the customer or client initiates the process by using the customer's computer 14 and the Internet 18 to log onto the web site implemented by web page server 24 in host computer 12. After logging on, the customer's . computer 14 will preferably provide client identification data to host computer 12 either automatically, or by the customer manually filling out a form including entries for the customer (client) name, company, identification number, version of the software used to create the design (program the chip 20), and e-mail address.

The JTAG programmer 40 and the downloader program 32 are preferably provided free of charge to the customer on a floppy disk or the like. Alternatively, either or both of programs 32 and 40 can be downloaded to the customer's computer 14 from host computer 12 after logging onto web site 24.

The program code for logging onto the web site can be implemented in downloader program 32 if it is initially provided to the customer. Alternatively, the customer's computer 14 can log onto the web site at the host computer 12 using a conventional Internet browser program such as Netscape® or Microsoft Internet Explorer® and download the downloader program 32 from the web site.

Assuming that chip 20 is a PLD or other programmable element that is programmed by the customer, design files 38 will be specific to chip 20 and will include several types of high and low level files. A high level design file will be a design source code file written in HDL Verilog® or other language that represents the desired logic function of chip 20. A high level design file can also be a design created by schematic capture. A low level design file will be a bitstream file that is essentially a compiled version of the high level design file. Design files 38 will preferably also include a Boundary Scan Description Language (BSDL) file that specifies the interconnections of boundary scan circuitry 20a.

In a next step 52, the customer's computer 14 may transmit the high and low level design files to host computer 12. The first test procedure is to compare the high and low level design files to determine if the low level file is properly derived (compiled) from the high level file. This can be performed either by the host computer 12 or by the JAVA script file 34 at the customer's computer 14.

In either case, the computer 12 or 14 that performed the test will preferably transmit a notification to the other computer as to the result of the test, or at least an indication of whether the test failed. At this point, a message can be displayed on either or both of computers 12 and 14 and the test procedure suspended. The test should be suspended because a lack of correspondence between the high and low level design files can be at least one source of the problem, and no further testing may be appropriate until this discrepancy is evaluated. The file evaluation can be performed by personnel at either the manufacturer's or the customer's location.

Assuming that these files correspond to each other, upon receipt of the high and low level design files, in step 54, vector generator 28, under control of general control unit 26, accesses vector database 30 and generates a set of test vectors for testing chip 20, and in step 56 transmits the vectors to the customer's computer 14. These are the test vectors designated as 36 in FIG. 1.

The preferred embodiment of the invention that will be described below utilizes test vectors in the form of digital bit streams that are intended for boundary scan testing under IEEE specification no. 1149.1. However, the scope of the invention is not limited to digital testing, and the term "test vectors" in the context of the invention will also be considered to include test data for analog parametric testing, and any other digital or analog testing that can implemented using a method of the invention.

Assuming that the design files 38 were either transmitted from the customer's computer in step 52, or were alternatively available at the host computer 12, vector generator 28 will access database 30 and generate a set of test vectors that is specific to the design or functionality programmed into chip 20.

As an alternative, if the design files were not available to the host computer for security or other reasons, or chip 20 was not programmed, vector generator 28 will access database 30 and provide a set of generic test vectors that are suitable to the model number of chip 20 as supplied by the customer's computer 14.

As yet another alternative within the scope of the invention, specific or generic test vectors can be generated in advance either by the manufacturer or by the customer and stored as part of design files 38 in the customer's computer 14.

In the next step, designated as 58, the customer's computer 14 tests the device (chip 20) using boundary scan circuitry 20a and test vectors 36 to produce test results. This is performed by JTAG programmer program 40 under control of JAVA script 34, as will be described below. Then, in step 60, the customer's computer 14 transmits the test results to host computer 12. In step 62, host computer 12 evaluates the test results to determine if the boundary scan testing produced an indication of a malfunction.

The result is a failure evaluation, which in step 64 host computer 12 transmits to the customer's computer 14 and the customer's computer 14 displays on a monitor and/or prints out as a report to the customer. As an alternative, JAVA script 34 or other software provided at the customer's computer 14 can perform the evaluation and transmit an evaluation to host computer 12.

Figure 3:
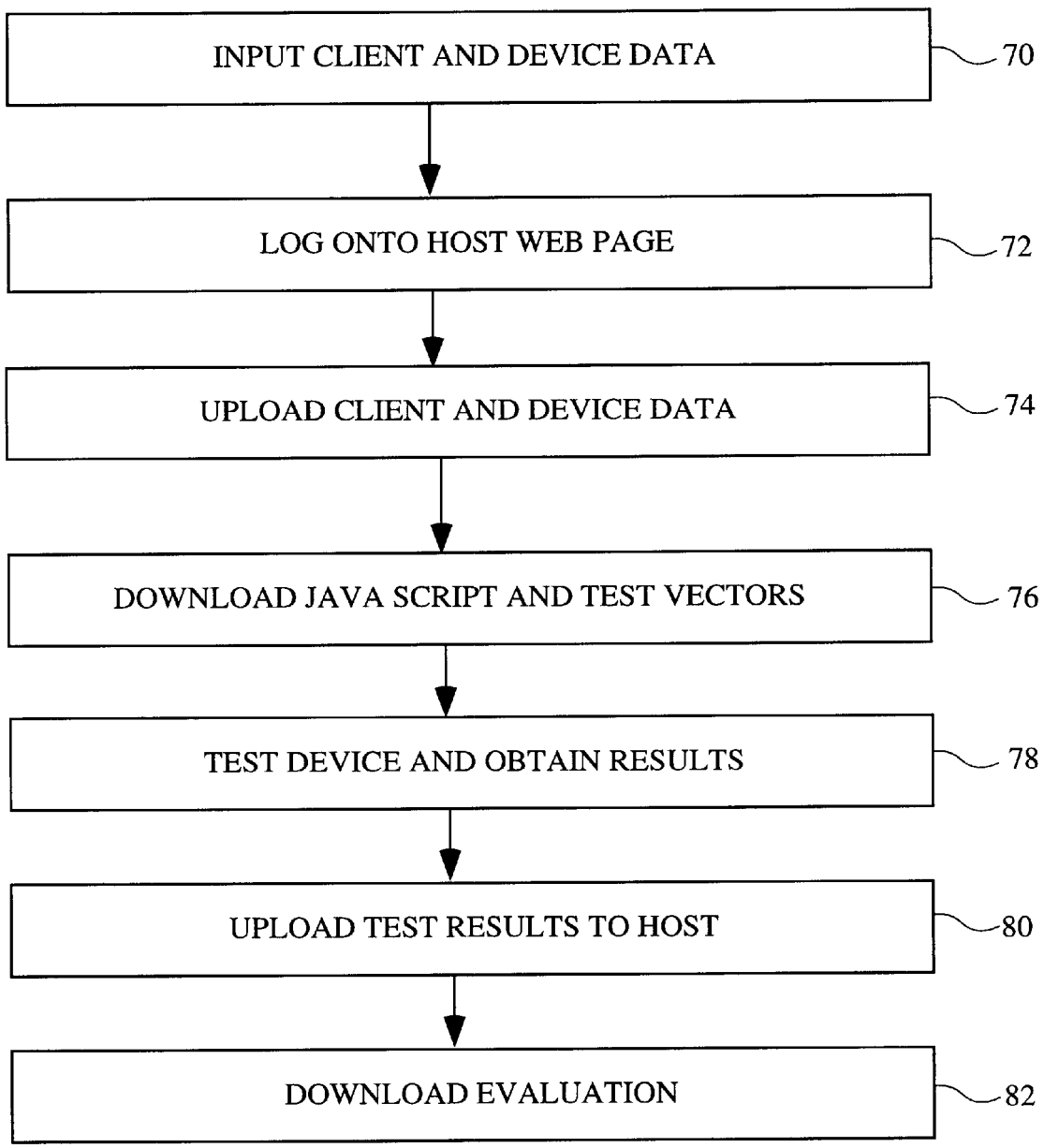
FIG. 3 is a flowchart illustrating the method steps performed by a host computer illustrated in FIG. 1.

FIG. 3 illustrates the individual method or process steps that are performed by the customer's computer 14. First, in step 70, downloader program 32 or a web browser is used to locate and input the client identification and design files 38. Preferably, design files 38 will be stored in a single predetermined subdirectory and can be automatically located. The client identification data can be stored in a text file in the same subdirectory as design files 38. Alternatively, the client identification data can be manually input by the customer after logging onto the web site.

In step 72, the customer's computer 14 logs onto the host computer's web page server 24, and in step 74 uploads the client identification data and device data. In step 76, the customer's computer 14 then downloads or receives JAVA script 34 and test vectors 36 from host computer 12. In step 78, JAVA script 34 is launched and controls JTAG programmer 40 to perform the boundary scan testing as described above, and produce test results that in step 80 are uploaded to host computer 12. In step 82, the customer's computer 14 then downloads and displays the evaluation of the test results from host computer 12.

The JAVA script 34 enables the entire testing and evaluation process to be performed automatically under control of host computer 12 after receiving the request and data from the customer's computer 14. However, alternatives to the JAVA implementation are possible within the scope of the invention. For example, the functionality of JAVA script 34 can be pre-stored as a separate program on the customer's computer 14 or implemented by downloader program 32, and launched by a script or other command from host computer 12.

Figure 4:
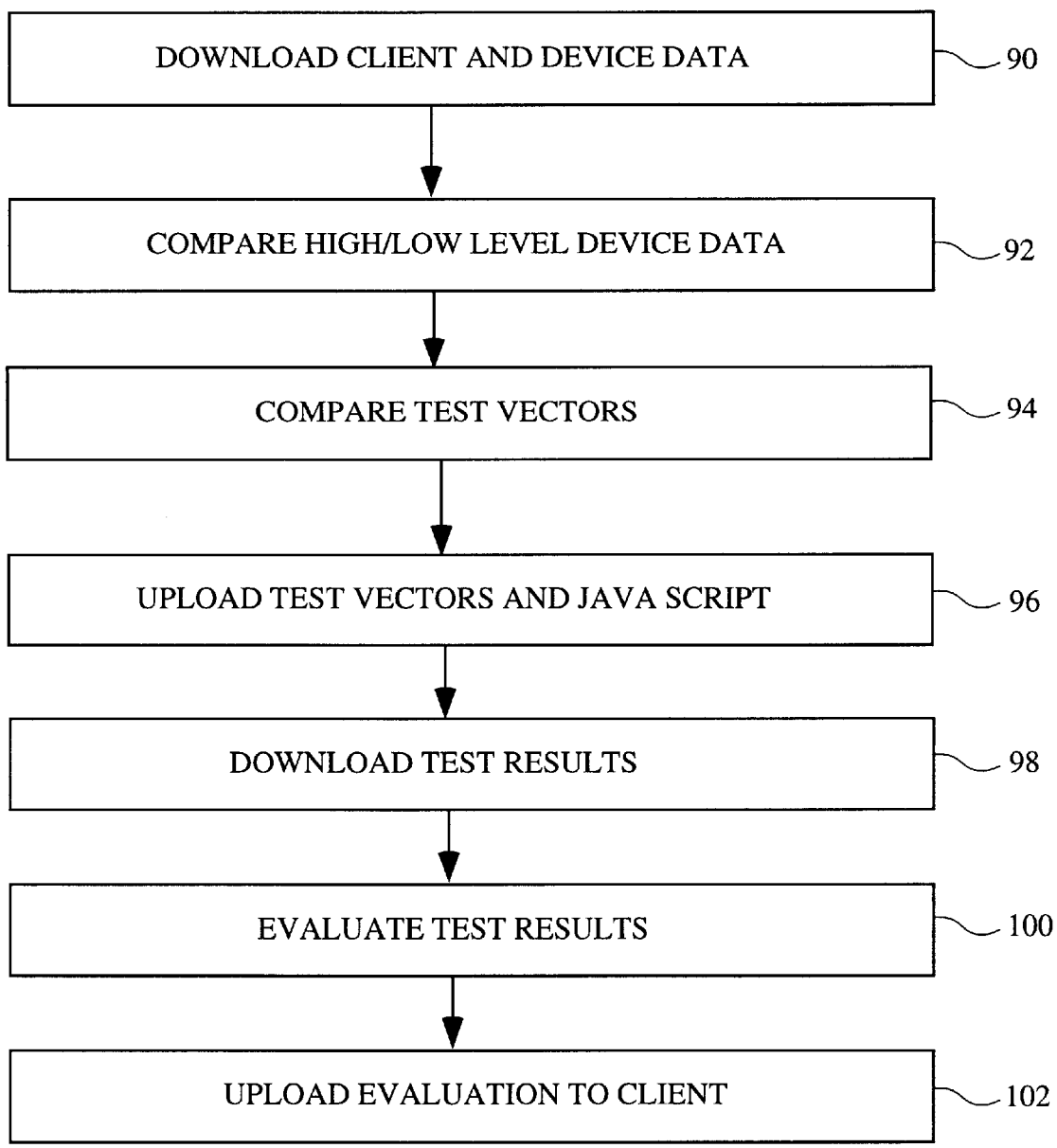
FIG. 4 is similar to FIG. 3, but illustrates the steps performed by a customer's computer.

The method steps performed by host computer 12 are illustrated in FIG. 4. In step 90, after the customer's computer 14 logs onto web page server 24, host computer 12 downloads client identification and device data as described above. Then in step 92, host computer 12 compares the high and low level design data and transmits an evaluation of this test to the customer's computer 14 if appropriate. Then in step 94, vector generator 28 generates test vectors 36, and in step 96 uploads vectors 36 to the customer's computer 14.

After completion of the boundary scan testing by host computer 12, in step 98 the customer's computer 14 downloads the test results, in step 100 processes the results to generate an evaluation, and in step 102 uploads the evaluation to the customer's computer 14.

In view of the above detailed description, it will be seen how the present invention is highly advantageous over the prior art. A customer can test a chip in situ and be automatically provided with results in minutes or less as compared to days or more in the prior art. No special operations or knowledge are required of the customer. All he has to do is connect board 16 to the customer's computer 14 using cable 22, call up and log onto the web site at host computer 12, and let the system 10 do the rest with minimal downtime of the customer's equipment.

The chip 20 does not have to be removed from board 16 and be subjected to potentially damaged pins, etc. The present method performs the boundary scan testing in situ and thereby determines definitively if the problem is chip 20 itself, external to chip 20 or due to an interconnection problem with other components on board 16. The level of speed and customer service provided by the present invention have been lacking and long desired in the art.

Various modifications will become possible for those skilled in the art after receiving the teachings of the present disclosure without departing from the scope thereof. For example, one or more of the method steps can be performed semi-manually or manually, such as the customer and manufacturer transmitting information and files to each using e-mail and attachments. In this case, each party will wait for the appropriate response from the other before performing their next step.

It is also within the scope of the invention to perform all of the testing and analysis using the customer's computer. In this case, all necessary software modules would be provided to the client either on media such as CD ROMs or floppy disks, or downloaded from the host computer. The customer would then run the software on his computer and evaluate the problem based on results of the testing.

What is claimed is:

1. A method for testing a programmable logic device operatively coupled to a circuit board, the programmable logic device having boundary scan circuitry, the method comprising:
   providing a first computer configured to communicate with the programmable logic device while operatively coupled to the circuit board, the first computer having access to design information for programming the programmable logic device;
   putting the first computer in communication with a network;
   sending the design information from the first computer over the network to a second computer in communication with the network, the second computer having access to a vector generator and a vector database;
   the second computer, in response to receipt of the design information from the first computer:
      accessing the vector database to obtain device vectors associated with the programmable logic device;
      providing the device vectors and the design information to the vector generator; and
      generating test vectors in response to the device vectors and the design information, the test vectors for testing the programmable logic device programmed according to the design information; and
   communicating the test vectors to the first computer for testing the programmable logic device.

2. The method of claim 1 further comprising:
   controlling the first computer with the second computer to, apply the test vectors to the boundary scan circuitry;
   produce test data in partial response to application of the test vectors; and
   communicate the test data to the second computer for analysis.

3. The method of claim 1 wherein the design information comprises design files and bitstream files, and the first computer or the second computer determines whether the bitstream files were generated from the design files without error.

4. The method of claim 1 wherein the first computer has access to a program configured to located at least a portion of the design information for providing to the second computer.

5. The method of claim 4 wherein the at least a portion of the design information is uploaded to a web page of a web page server associated with the second computer.

6. The method of claim 1 wherein the first computer has access to a script.

7. The method of claim 6 further comprising:
   launching the script to control a programmer module;
   testing the programmable logic device using the test vectors and the programmer module to access and influence the boundary scan circuitry; and
   producing test results in response to the testing.

8. The method of claim 7 wherein the programmer module is a Joint Test Action Group (JTAG) programmer.

9. The method of claim 7 further comprising:
   automatically communicating the test results to the second computer for evaluation.

10. The method of claim 9 further comprising:
    evaluating the test results to generate an evaluation; and
    communicating the evaluation to the first computer.

11. The method of claim 10 wherein the network comprises a portion of the Internet.

12. The method of claim 10 wherein the design information comprises device data.

13. The method of claim 10 wherein the first computer is configured to communicate with the programmable logic device while operatively coupled to the circuit board by use of a Joint Test Action Group (JTAG) cable.

14. The method of claim 10 wherein the design information comprises design source code files.

15. The method of claim 14 wherein the design source code files comprise a Boundary Scan Description Language (BSDL) file.

16. A method for testing a programmable logic device operatively coupled in situ to a circuit board, the programmable logic device having boundary scan circuitry, the method comprising:
    providing a first computer configured to communicate with the programmable logic device while operatively coupled in situ to the circuit board, the first computer having access to device files, the device files comprising source code files and compiled versions of the source code files configured to program the programmable logic device;
    putting the first computer in communication with a network;
    providing a second computer in communication with the network, the second computer having access to a vector generator and a vector database, the second computer having access to a web page;
    invoking the web page causing a program to be sent to the first computer, the program causing the first computer to send information to the second computer over the network, the information sent including the device files, software version data and client identification data;
    in response to receipt of the information sent from the first computer, using the second computer to:
       access the vector database to obtain vectors;
       provide the vectors and the device files to the vector generator;
       generate a set of test vectors with the vector generator in response to the vectors and the device files; and
       communicate the set of test vectors, a script, and a programmer module to the first computer.

17. The method of claim 16 further comprising:
    controlling the first computer with the second computer to:
       launch the script to control the programmer module;
       test the programmable logic device using the set of test vectors and the programmer module to access and influence the boundary scan circuitry;
       produce test results in response to boundary scan testing of the programmable logic device; and
       communicate the test results to the second computer for analysis.

18. The method of claim 17 further comprising:
    evaluating the test results to generate an evaluation; and
    communicating the evaluation from the second computer to the first computer.

19. The method of claim 16 wherein the source code files are written in a language for representing logic functions, and compiled versions of the source code files are in a bitstream form.

20. The method of claim 16 wherein the device files comprise a Boundary Scan Description Language (BSDL) file, and wherein the programmer module is a Joint Test Action Group (JTAG) programmer.

* * * * *